Feb. 6, 1940. M. H. FRISBIE 2,189,464
WHEEL HUB CONSTRUCTION
Filed Nov. 10, 1936
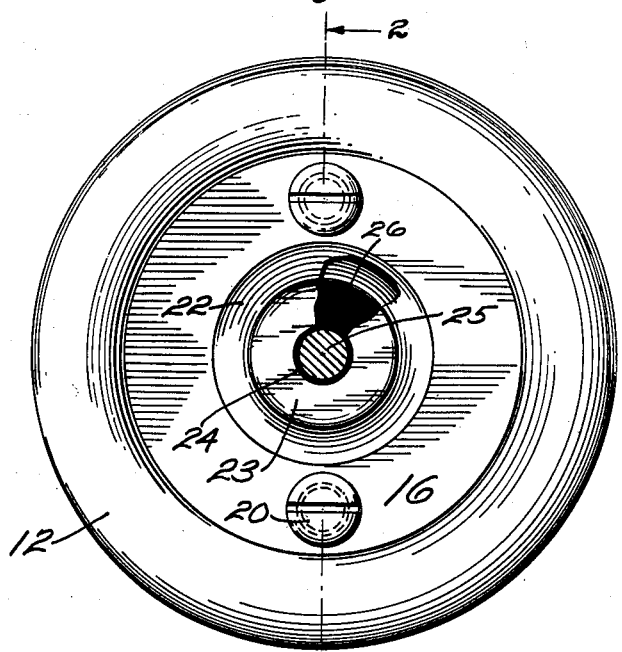
Fig. 1
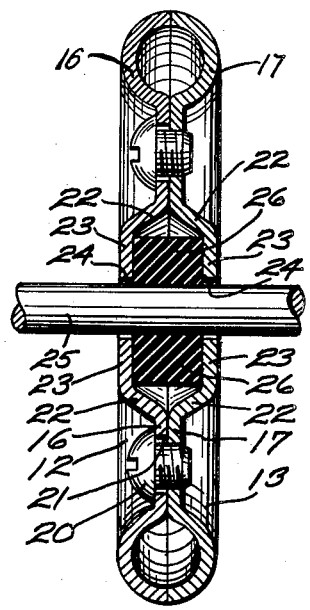
Fig. 2
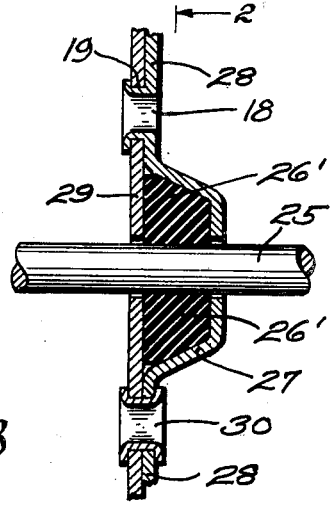
Fig. 3
Fig. 4
INVENTOR
Marshall H. Frisbie,
BY
ATTORNEY Patented Feb. 6, 1940

2,189,464

UNITED STATES PATENT OFFICE 2,189,464

WHEEL HUB CONSTRUCTION

Marshall H. Frisbie, Hamden, Conn., assignor to The A. C. Gilbert Company, New Haven, Conn., a corporation of Maryland Application November 10, 1936, Serial No. 110,082

3 Claims. (Cl. 46—221)

This invention relates to wheel and shaft assemblies and particularly to hub constructions for toy wheels of a type permitting the wheel to be pressed on to the end of a shaft by the fingers of the operator's hand and in like manner forced to any desired position lengthwise of the shaft as may be required in the assemblage and reassemblage of toys having movable parts.

An object of the invention is to provide a wheel of exceedingly cheap construction which may be assembled with a shaft in the manner described and as easily removed therefrom at will and without the use of any tools or extraneous fastening devices.

Another object is to provide a wheel of this character which shall suffer no deterioration or impairment of its ability to cling to the shaft after many repeated operations of assembly with and removal from the shaft and which shall retain its ability to assume true alignment with a plane perpendicular to the axis of the shaft as well as true concentricity with the shaft after such repeated use.

A further object of the invention is to provide a wheel of the character described, so constructed that its periphery may be differently formed to serve the various uses of a traction wheel, pulley, gear or the like, for which purpose one form of the improvements contemplates a wheel made of two sheet metal parts which may be permanently or detachably secured together in the manufacture of the article.

The above and other objects will appear more plainly from the following description of illustrative embodiments of the improvements having reference to the accompanying drawing, wherein:

Fig. 1 is a side view of a wheel provided with the mounting hub construction of these improvements shown partly broken away to expose the interior resilient hub ring which surrounds and hugs the shaft, the latter being shown in cross section.

Fig. 2 is a view taken in section on the plane 2—2 in Fig. 1 looking in the direction of the arrows.

Fig. 3 shows a modification of the hub construction of Fig. 2 and different forms of fastening devices for holding the parts of the wheel together.

Fig. 4 shows a still further modified construction of hub which may be used for some of the purposes of the invention.

In Figs. 1 and 2, my improved wheel is shown to be constructed of assembled halves 12 and 13 which may be formed from sheet metal to a shape suitable for use as a traction wheel. It will be understood that other types of peripheral formation may be chosen, such for instance as a grooved shape which will make the wheel suitable for use as a pulley. The disc portions of the two halves of the wheel are indicated at 16 and 17 for the traction type of wheel and may be held together in rigid abutting surface to surface contact at suitable points about the circle by one or more ordinary screws 20 passing through a clearance hole 21 in the disc 16 and having threaded engagement with the disc 17.

Each wheel disc of Figs. 1 and 2 has a similarly dished portion 22 providing the spaced walls 23 having central clearance holes 24 in axial alignment through which shaft 25 may be inserted. The chamber formed by the dished portions 22 contains a ring of resilient material which may be rubber of suitable firmness and compressibility whose cross sectional shape is shown in Fig. 2. This resilient ring 26 is preferably made to have a normal width when uncompressed slightly in excess of the space provided for it between the walls 23 so that when assembled in place as shown, walls 23 exert a squeezing pressure upon the resilient ring 26 which, if made of rubber or material possessing a surface of similar clinging properties, will be clamped in fixed rotative relation to the wheel.

The resilient ring 26 is provided with a bearing hole somewhat smaller in diameter than the size of the shaft 25 but of such dimension that the shaft may be forced through the ring by finger pressure. While a considerable range of variation in the exact relative dimensions of the parts above described is possible within the principles of these improvements, depending upon the physical characteristics of the substance of which ring 26 is comprised, I have determined that a satisfactory relationship of dimensions may be as follows in the case of a ring comprised of rubber as soft or a little softer than that commonly used in the treads of automobile tires. For use with a shaft of approximately $\frac{5}{32}$" diameter, the ring 26 may be $\frac{7}{16}$" in outside diameter and provided with an unstretched bearing hole of approximately $\frac{7}{64}$" diameter. Such a ring may be $\frac{1}{16}$" in width when axially uncompressed and the space provided for it between the walls 23 may be $\frac{1}{32}$" less than the free width of the ring. The ring 26 is circularly continuous, but in larger constructions and for industrial uses might be made in arcuate sections abutting to compose a shaft surrounding hub.

The ring 26 may be centered with the periphery of the wheel by the fit of its own periphery within the cylindrical or conical walls of dished portions 22. The clearance holes 24 may have a free sliding fit on the shaft 25 without impairing the clinging action of ring 26 with respect to the shaft, but in practice I prefer to make the clearance hole or aperture 24 larger than the diameter of the shaft by a dimension which will avoid all requirement of smooth surfaces and accuracies in size of the parts to be assembled. Thus clearances ranging from a few thousandths of an inch to substantially greater dimensions are optional as to the metal parts comprised in the construction of these improvements depending somewhat upon the firmness of the material comprising the ring 26. If made of elastic fibrous compositions not lending themselves to the production of sharp corners and the maintenance of straight line surfaces, the clearance above discussed will preferably be small enough to cause the shaft 25 to engage with the edge of hole 24 upon excessive forced departure of the wheel from true perpendicular alignment relative to the shaft in the transimssion of power to or from the wheel.

If a still firmer hold of the walls 23 upon ring 26' is desired, the inner surfaces of these walls may be ribbed or abraded, although I have found that the cling of smooth metallic walls against the sides of the ring tends to exceed the cling of the ring to the shaft and hence possesses all of the holding power necessary for use as movement transmitting mechanism in toys.

In Fig. 3 the dished portion 27 of the wheel disc 28 provides the entire width of the chamber in which ring 26' is confined, permitting the other half or part of the wheel to comprise a flat plate 29. The parts 28 and 29 in this modification may be secured together by eyelets such as 30, or by heading over a number of projections like 18 struck up from the metal of part 28 and projecting through an aperture 19 in disc 29.

In Fig. 4 the use of a rubber hub 31 is illustrated for mounting the centrally apertured single-ply disc 32 upon the shaft 25. The periphery of disc 32 may be circular and cut or stamped to form gear teeth 33. The hub 31, which may be made of resilient material other than rubber, is provided with a groove 34 around its periphery and may be distorted or caused by pressure to collapse to a sufficient extent to permit either of its flange portions 35 to be forced through the central hole in disc 32. The diameter of groove 34 and the width of this groove in relation to the size of that portion of disc 32 which engages the groove is such that the hub 31 upon springing to its normal shape and size clings to the disc with sufficient firmness to hold the latter in desired rotative relation to the shaft. Cement or bonding may be employed to more firmly join hub 31 and disc 32 if desired. As in Figs. 1, 2 and 3, the shaft 25 is gripped by the press fit of hub 31 thereupon.

Any one of the resilient mounting bodies of Figs. 2, 3 and 4 may have a periphery other than cylindrical and other than round and may have side faces other than planar, the portions of the wheel structure engaging with the resilient mounting bodies being modified to conform to their contours. The conical shape of the ring 26' in Fig. 3 is an example of such modification wherein the squeezing together or compression of the substance of the ring will exert a force tending to resist expansion of the size of the shaft hole when it is occupied by the shaft. Radially or diametrically extending spokes or arms in place of a circularly complete wheel may comprise the rotor to be equipped with my improved mounting hub construction and such spokes or arms may be made in two parts held together as are the two parts of the wheels of Figs. 2 and 3.

Devices may be substituted for the ring comprising walls 23 which may be attached to, rather than integral with, the peripheral portions of the wheel, and such devices need not form a closed chamber nor completely house the ring 26 in order to hold it for rotation in unison with the wheel. Many other modifications of the exact construction shown will occur to those skilled in the art and may be employed for putting into practice the principles underlying these improvements, and the appended claims will be understood to be inclusive of all mechanical equivalents which fairly come within their terms.

I claim:

1. A toy wheel comprised of united disc-like members each having an outwardly dished wall in its hub portion containing an aperture thereby to form an open ended chamber of substantial axial extent in the hub portion of the wheel, and a body of resilient material clamped axially between said member walls within said chamber with sufficient compressive force to be held thereby in fixed rotative relation to said members and having an axial bore of expandible size for admitting thereto a cylindrical shaft of greater size than the normal size of said bore, said size of the bore being sufficiently smaller than said aperture to preclude contacting of said walls with said shaft.

2. In a toy wheel and shaft assemblage in combination with a cylindrical shaft a hub body of compressible resilient material presenting clampable faces at respectively opposite axial ends of said body and having a round axial hole smaller than said shaft affording press fit assemblage of said body therewith, a wheel hub structure including axially spaced end walls respectively overlapping radially outer annular margins of said clampable end faces of the hub body and assembled together in a manner to compress the radially outer portions of said body axially therebetween to an extent operative to hold said body in fixed relation to said walls, the said walls being cut away to expose and to leave unconstrained a full inner annular portion of each of said end faces of the hub body bordering upon said axial hole thereby to preserve to all of the said resilient material which directly encompasses said hole the ability to yield and to cling uniformly to the full circumference of said shaft.

3. A toy wheel comprised of united disc-like members, one of which members is comparatively flat and has a planar wall containing a central aperture and the other of which members has a wall dished away from said flat member also containing a central aperture and forming together with said wall of the flat member an open ended chamber of substantial axial extent in the hub portion of the wheel, and a body of resilient material clamped axially between said member walls within said chamber with sufficient compressive force to be held thereby in fixed rotative relation to said members and having an axial bore of expandible size for admitting thereinto a cylindrical shaft of greater size than the normal size of said bore, said size of the bore being sufficiently smaller than said aperture to preclude contacting of said walls with said shaft.

MARSHALL H. FRISBIE.